Oct. 16, 1951   J. A. GREEN   2,571,566
CONTROL SYSTEM FOR MULTIPLE ROTOR HELICOPTERS
Filed Jan. 4, 1949   3 Sheets-Sheet 3
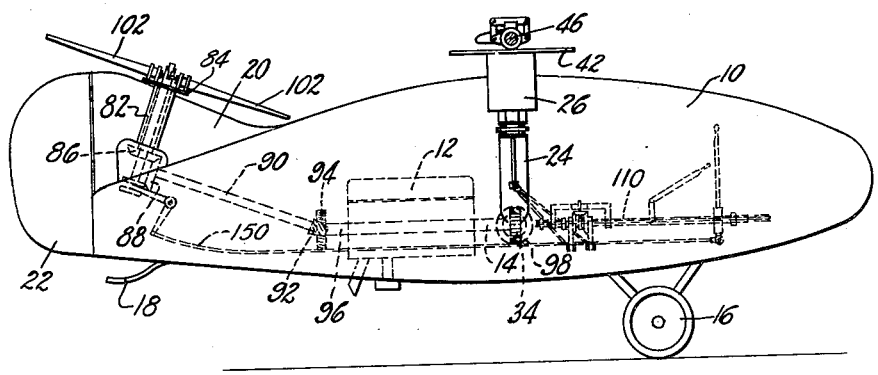
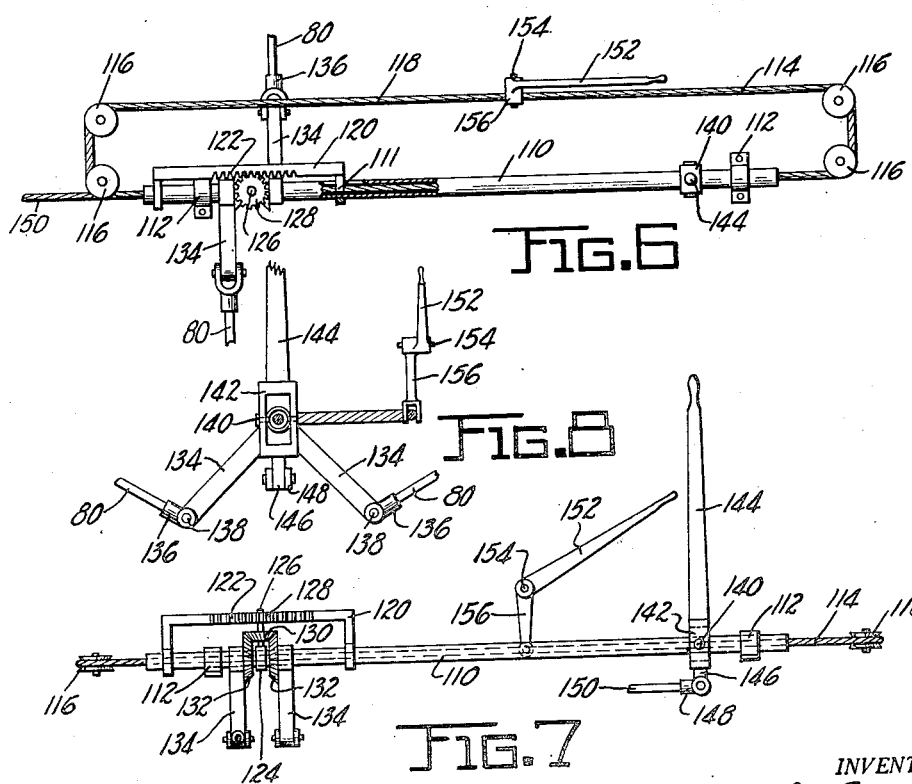
INVENTOR.
JOHN A. GREEN.
BY
Altsch & Knoblock
ATTORNEYS Patented Oct. 16, 1951

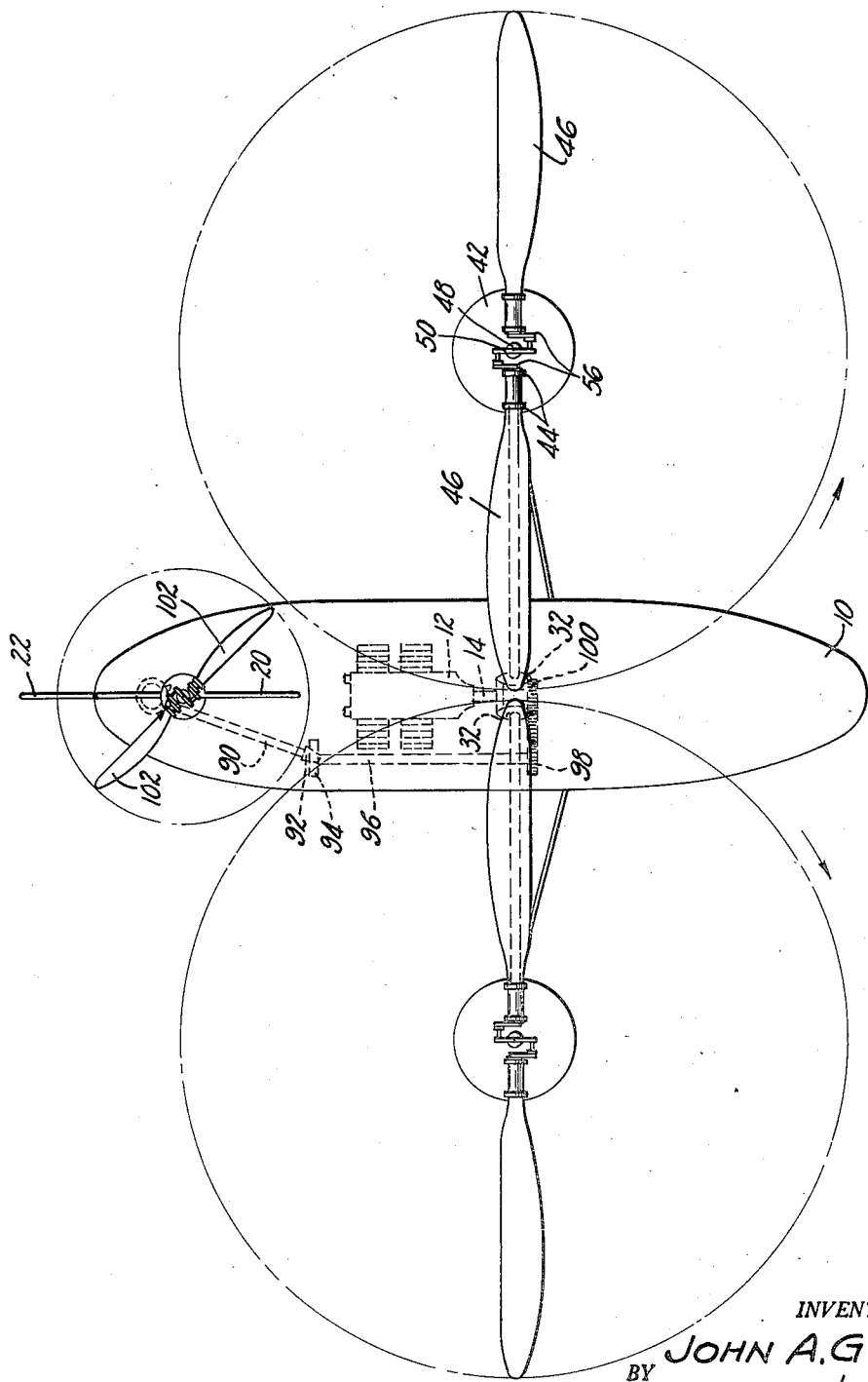

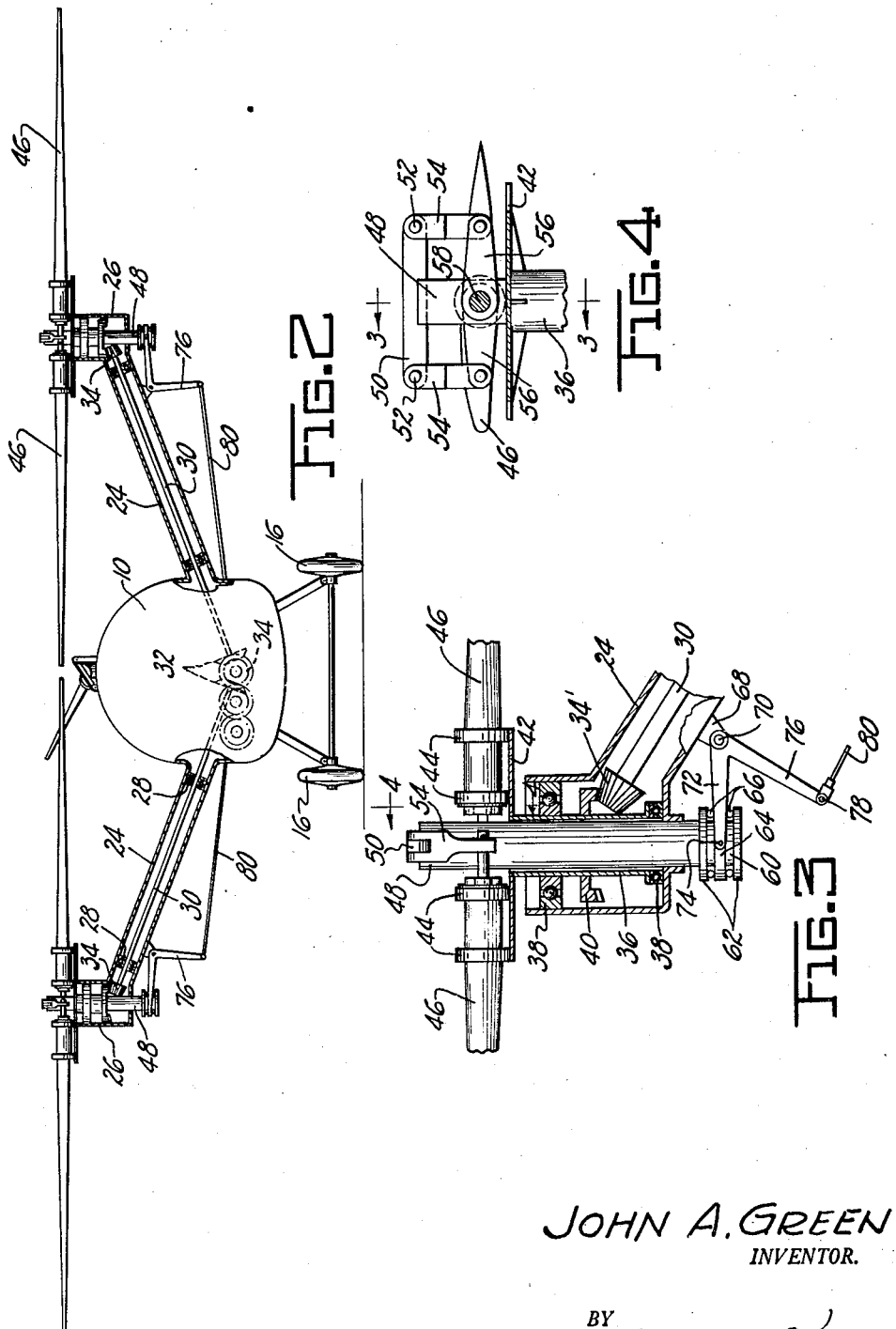

2,571,566

UNITED STATES PATENT OFFICE 2,571,566

CONTROL SYSTEM FOR MULTIPLE ROTOR HELICOPTERS

John A. Green, Wakarusa, Ind.

Application January 4, 1949, Serial No. 69,202

3 Claims. (Cl. 244—17.23)

This invention relates to improvements in helicopters.

The primary object of the invention is to provide a helicopter constructed to possess inherent stability during hovering, cruising and maneuvering.

A further object is to provide a helicopter having a pair of laterally spaced main rotors which rotate in opposite directions, and a rear rotor which rotates in a plane and about an axis, both of which are disposed at an angle to the longitudinal axis of the craft and usable for control of the position of the craft about its transverse horizontal axis.

A further object is to provide a device of this character having a plurality of rotors, each having a plurality of vanes or blades which may be set at any selected pitch required for different operating conditions of the craft.

A further object is to provide a device of this character having three rotors whose vanes are adjustable as to pitch and relatively controllable to control the operating conditions and the attitude of the craft about its longitudinal axis and about a transverse horizontal axis.

A further object is to provide a helicopter having a plurality of motor-driven rotors so located and arranged that they provide a substantial inherent stability for the craft and constructed to have the vanes thereof adjusted as to pitch, together with novel control mechanism for regulating the pitch of the rotors in any manner desired.

Other objects will be apparent from the following specification.

In the drawing:

Fig. 1 is a top plan view of the helicopter.

Fig. 2 is a view of the helicopter in front elevation.

Fig. 3 is an enlarged fragmentary detail sectional view taken on line 3—3 of Fig. 4.

Fig. 4 is a fragmentary detail sectional view taken on line 4—4 of Fig. 3.

Fig. 5 is a view of the device in side elevation.

Fig. 6 is an enlarged top plan view illustrating a control system used by the device.

Fig. 7 is a side view of the control system.

Fig. 8 is a front view of the control system.

Referring to the drawings which illustrate the preferred embodiment of the invention, the numeral 10 designates the fuselage of the craft which may be of any suitable size and shape and which mounts therein a suitable power member, such as an internal combustion engine 12, illustrated schematically in Figs. 1 and 5 and having a drive shaft 14. The fuselage is mounted upon ground wheels 16 adjacent its forward end and may have a downwardly projecting strut 18 adjacent its rear end. A vertical stabilizer panel or element 20 projects from the rear end of the fuselage, and a vertical rudder 22 is pivoted to the rear edge of said stabilizer.

Laterally projecting hollow housings 24 project from the fuselage 10 in upwardly outwardly inclined position, said parts 24 preferably being located intermediate the longitudinal dimension of the fuselage and being laterally balanced. At their outer ends the hollow members 24 terminate in substantially cup-shaped upwardly projecting housing parts 26. Bearings 28 are mounted in longitudinal spaced relation in each of the housing parts 24 and serve to journal shafts 30 whose inner ends mount bevel gears 32 which mesh with a bevel gear 34 mounted upon the engine drive shaft. The outer end of each shaft 30 mounts a beveled pinion 34′ positioned to at least partially extend into the housing portion 26.

As best illustrated in Fig. 3, a tubular hub member 36 is suitably journaled as at bearings 38 in the housing part 26 in central position to extend substantially vertical when the fuselage 10 is in its normal attitude, for example, its attitude in normal flight. A bevel gear 40 is fixed upon the hub 36 and meshes with the pinion 34′ to be rotated thereby. The tubular member 36 mounts a cross-plate 42 extending perpendicularly thereto at its upper end, and this plate mounts a plurality of sets of bearings 44, the number of sets being equal to the number of blades used in each rotor and being here illustrated as comprising two sets. The rotor vanes 46 are positioned and supported by the bearings 44 and are rotatable about their longitudinal axes within said bearings 44 for purposes to be mentioned hereinafter.

Within the tubular hub 36 is positioned an elongated shaft 48 having a snug but longitudinally slidable fit within said hub. The shaft 48 is of greater length than said hub and, as best illustrated in Fig. 3, the lower end of said shaft projects below the bottom of the housing part 26, and the upper end of said shaft projects above the cross-plate 42 and the rotor vanes mounted in the bearings 44. A cross-arm 50 is fixedly secured to the upper end of the shaft 48, and at its opposite ends and in equispaced relation to the shaft 48 are located transversely projecting rigid pins 52. The pins 52 are connected by links 54 with crank arms 56 fixedly secured to the cylindrical inner end portion 58 of each rotor vane.

The arrangement is such that a change in the longitudinal position or adjustment of the shaft 48 with respect to the hub 36 will raise or lower the cross-head 50 and serve to tilt the crank arms 56 carried by the vanes 46 through the connected linkage for the purpose of changing the pitch of the rotor vanes. The construction has been illustrated as applied to the use of rotors having two vanes, in which event the cross-head 50 constitutes a straight elongated rigid member projecting radially at its ends from the shaft 48. In cases where more than two vanes 46 are provided, it will be understood that the member 50 will constitute a rigid spider centered on the member 48 with its arms projecting radially therefrom and equal in number to the number of vanes, and that each of these arms will have a connection with one of the rotor vanes. It will also be apparent that where two vanes are employed in each rotor, the tilting adjustment thereof will be equal and opposite. This will assure the same angle of attack of each of the vanes of a given rotor and, where more than two vanes are provided in the rotor, the construction for adjustment of pitch will likewise provide equal pitch angles of each vane at all times.

The shaft 48 is adapted to rotate with the hub 36 and at its lower end mounts a collar 60 having enlarged flanges 62 at its opposite ends. A ring 64 encircles the collar 60 and bearings 66 are interposed between said ring and the flanges 62 to accommodate relative rotation of the collar with respect to the ring. A bellcrank is pivoted to a bracket 68 carried by the housing 24 adjacent to the collar 60, the pivot axis of said bellcrank being designated by the numeral 70. One arm 72 of the bellcrank is bifurcated and is pivotally connected at diametrically opposite points 74 to the ring 64. The other arm 76 of the bellcrank has pivotally connected thereto at 78 a rigid controller operating rod 80.

A forwardly upwardly inclined housing portion 82 is carried by the rear end of the fuselage 10 and preferably constitutes an enlargement of the stabilizer panel 20. A hub 84 is journaled in this housing portion 82 with its axis located in a vertical plane but inclined forwardly and upwardly. A bevel gear 86 is fixed upon the hub and meshes with a bevel gear 88 mounted upon a shaft 90 extending through the fuselage 10 in a forward downward direction and mounting a pinion 92 which meshes with a pinion 94 mounted upon a longitudinally extending shaft 96. The shaft 96 mounts a pinion 98 at its front end, and this pinion meshes with a gear train including a pinion 100 mounted upon the engine drive 14. Rotor vanes 102 are mounted upon the hub 84 and are of substantially the same construction as illustrated in Fig. 3, whereby the pitch of said vanes may be varied by mechanism similar to that disclosed in Figs. 3 and 4. The inclined position of the hub 84 of the rear rotor causes the rotor vanes 102 to rotate in a plane inclined relative to the longitudinal axis of the fuselage 10 as will be apparent. This inclination of the rear rotor introduces both a vertical lift component and a forward propulsion component in the operation of the craft.

The control mechanism located within the fuselage of the craft, by means of which the pitch of the vanes of the various rotors is adjusted, is best illustrated in Figs. 6 and 8. The construction illustrated entails means for individually controlling the pitch of each vane to achieve a setting thereof different from the setting of the other vanes and, alternatively, may be utilized simultaneously to adjust the pitch of the vanes of the two main rotors. The construction illustrated for this purpose entails the mounting of an elongated tube 110 in a substantially longitudinally extending position within the craft, as illustrated in Fig. 5, supported by brackets 112 carried by the fuselage. The brackets 112 permit rotative movement of the tube 110 with respect thereto. A cable 114 has its opposite ends inserted in the ends of the tubular member 110 and passes around a set of four or more pulleys 116 journaled about axes fixed with reference to the fuselage. The arrangement thus provides a central run 118 of the cable spaced from the tube 110. In the preferred embodiment of the invention the tubular member 110 will be located at the right with respect to the operator's seat, and the cable run 118 will be located at the left with respect to the operator's seat, in each case as considered by an operator occupying such seat.

At one of its ends the tubular member 110 mounts a U-shaped member 120 for longitudinal movement relative thereto, said member 120 being keyed to the member 110 to accommodate such sliding movement and to prevent rotation of the member 120 relative to the tube 110. The ends of the cable 114 within the tube 110 are secured to the ends of the member 120 at 111. The member 120 includes a central portion spaced from the tube having gear teeth cut therein to define a gear rack 122. The tubular member 110 mounts a member 124 in which is journaled a stud shaft 126 whose outer end fixedly mounts a pinion 128 which meshes with the rack 122. A bevel pinion 130 is also fixed upon the shaft 126 and meshes with bevel gears 132 journaled upon the tubular member 110. Each of these bevel gears 132 has welded or otherwise fixedly secured thereto a rigid arm 134 which also is journaled upon the tubular member 110 and which projects radially therefrom. As best illustrated in Fig. 8, the arms 134 extend at an angle to each other as in an inclined downward direction. Clevices or other fittings 136 are pivotally connected at 138 to the free ends of the levers 134, and the inner ends of the rods 80 are connected to said clevices. The complete rod 80 has not been illustrated herein, and it will be understood that, if necessary, the part 80, instead of constituting a single rigid rod, may constitute a plurality of rods interconnected through suitable levers, or any other construction suitable for transmitting rocking movement of the lever arms 134 about the axis of the tubular member 110 for the purpose of rocking the bellcranks 72—76 and longitudinally shifting the shafts 48 relative to the hubs 36 in which they fit.

The tubular member 110 has pivoted thereto about an axis which is positioned transversely and horizontally in the normal balanced flight position of the parts, which axis is designated by the numeral 140, a rigid yoke member 142. The yoke member mounts an upwardly extending control handle or lever 144 at its upper end and a rigid downwardly projecting extension 146 at its lower end. A clevis or other fitting 148 is pivoted at the lower end of the part 146 and is mounted upon the front end of a rigid rod 150 or rigid multiple part assembly which extends to a device similar to that illustrated in Fig. 3 for adjusting the pitch of the vanes 102 of the rear rotor.

In the operation of the helicopter the two main rotors are caused to rotate in opposite directions so that the forces exerted by the vanes thereof are fully and equally counterbalanced and lateral stability of the craft is inherently secured. Thus if the upper main rotor, as viewed in Fig. 1, is rotating in a counterclockwise direction, the lower main rotor illustrated in the same figure will be operating in a clockwise direction as indicated by the arrows in Fig. 1. This arrangement avoids all necessity for changing the pitch of the vanes of the rotors at different angular positions thereof as has heretofore been required in helicopters. In other words, the vanes of the instant rotor maintain the same angle of attack at all times through each cycle of rotation thereof. When the vanes are positioned as illustrated in Fig. 1, so that each blade of each rotor is in the same angular position as the complementary blade of the other main rotor at each instant during the rotation of the craft, it will be apparent that the moments and forces exerted in the operation of the device will be equal at all times, assuming that the vanes of the two rotors are set at the same angle of attack. The rear rotor is preferably smaller than the other rotors, and its axis is preferably located in the central vertical plane of the fuselage to be balanced and equispaced from the hubs of the two main rotors. The forces exerted by the rear rotor by reason of its position and inclination are essentially forces which tend to control the vertical attitude of the craft and to impart forward propulsion to the craft. The only control usually provided which is comparable to a conventional airplane is the rudder 22 which is preferably employed but which may be omitted completely if desired. Where employed, it is used to turn the craft laterally to facilitate sharp changes in direction and increases the directional stability of the craft. Such changes in direction, however, may be made by the craft even if the rudder 22 is omitted, as will be described hereinafter.

It will be apparent that the rear rotor may be adjusted with respect to the pitch setting of its vanes 102 by manipulating the control handle 144 to either pull or push upon the same. This control handle thus pivots about the axis 140 to either push or pull upon the control rod 150, which movements will respectively increase and decrease the angle of attack or the pitch setting of the vanes 102. Where it is desired to change the pitch of the vanes 46 of one main rotor relative to the other, the control lever 144 is swung from side to side in a manner to rotate the tubular member 110 in the brackets 112 which journal it. Inasmuch as the rack 120, 122 is keyed to the tubular member, and the member 124 which journals the shaft 126 is fixed upon the tubular member, it will be apparent that the entire assembly illustrated at the left in Figs. 6 and 7 will swing about the axis of the tubular member 110, thereby causing the lever arms 134 to swing equally and in the same direction. This movement will introduce a pushing force upon the rod or rod assembly 80 located at the side of the unit toward which the rocking or swinging motion occurs and will pull upon the opposite rod or rod unit 80. The two rod units will move equally but oppositely so as to raise the shaft 48 of one of the main rotors and to lower the shaft 48 of the other main rotor, thus causing opposite rotation of the vanes of the two rotors about their longitudinal axes. It will therefore be apparent that the reaction of the two main rotors in such adjustment will be opposite so that one rotor will have its vanes set in an attitude which will produce a greater lift than the other. This difference in lift will cause the craft to bank about its central longitudinal axis and also will introduce a certain longitudinal turning moment. This turning moment may alone be sufficient to change the direction of flight of the craft, although I prefer to use the rudder 22 simultaneously with the relative adjustment of the pitch of the vanes of the two main rotors for such turning purposes to increase the control of flight direction available to the operator of the craft.

In instances where it is desired to increase or decrease the pitch of the vanes 46 of the two rotors simultaneously and equally and in the same direction, the hand lever 152 pivoted to a suitable support upon the fuselage of the craft at 154 and having a lower end portion 156 which is connected to the run 118 of the cable 114, may be moved forwardly or backwardly about its pivot axis 154. Movement of the lever causes movement of the cable in a manner to shift the member 120 lengthwise of the member 110. This longitudinal movement of the member 120 relative to the member 110 causes the rack portion 122 thereof to rotate the pinion 128, the shaft 126 and the bevel gear 130. The rotation of the bevel gear 130 is transmitted by the bevel gears 132 meshing therewith to the lever arms 134. Inasmuch as the bevel gears 132 are journaled upon the tube 110 and hence are coaxial, and further inasmuch as they mesh with the bevel gear 130 at diametrically opposite points of the gear 130, the gears 132 are caused to rotate in opposite directions. Consequently, rotation of the gear 130 in one direction will cause the lever arms 134 carried by or secured to gears 132 to swing inwardly toward each other, while rotation of the gear 130 will cause said arms to swing oppositely outwardly and away from each other. The construction is such that the lever arms 134 are swung an equal amount or through an equal arc for each rotative movement of the bevel gear 130. Thus the arms 134 pull equally upon the rods or rod units 80 and cause equal and similar adjustment of the setting of the rotor blades 46 of the two main rotors, which adjustment occurs simultaneously. Thus it will be apparent that where the craft is hovering and the lift of the vanes is to be either increased or decreased to facilitate climbing or descent of the craft, the manipulation of the lever 152 will cause simultaneous adjustment of the pitch of the vanes of the main rotors to produce the action of the craft desired without disturbing the balance or stability of the craft.

It will be apparent from the foregoing description of the device that an inherently stable craft is provided whose complete control is readily effected by a simple control mechanism adjustable in any of a number of movements to control the lifting reaction of the rotors with the air, to control the longitudinal attitude of the craft, and to control its lateral attitude. Substantially all factors relating to control of the craft in flight are those accommodated by those control means, although as mentioned previously, a direction control rudder 22 may be utilized if desired. In connection with the foregoing it will be understood, of course, that control of the engine will also effect flight reaction to some degree at least, and separate controls for the engine must be provided.

While the preferred embodiment of the invention has been illustrated and described herein, it will be understood that the construction shown and described is illustrative and is not intended to be limiting, and that other constructions may

I claim:

1. In a helicopter having a fuselage, a pair of main rotors carried by said fuselage in laterally spaced balanced relation for rotation about vertical axes, a rear rotor carried by said fuselage for rotation on an axis disposed at an angle to the vertical and spaced rearwardly from said main rotors, each of said rotors including a plurality of radial vanes rotatable about their respective longitudinal axes, and mechanism for controlling the angular disposition of the vanes of each rotor simultaneously and including a rotatable member journaled in said fuselage, linkages connecting said main rotors with said rotatable member to be actuated simultaneously by rotation thereof to produce like pitch changes in the vanes of the main rotors, a control lever pivoted to said rotatable member about an axis transverse of the axis of rotation of said member, linkage connecting said control lever with said rear rotor, displaceable means connected to the linkages associated with said main rotors arranged to actuate said last named linkages simultaneously to produce opposite pitch changes in the vanes of said main rotors and independently of said rotatable member and including a second control lever.

2. In a helicopter having a fuselage and a rotor including a rotatable hub, a plurality of radial variable pitch vanes supported by and journaled on said hub, and mechanism for varying the pitch of said vanes including a part shiftable axially in said hub; mechanism for actuating said last named part comprising linkage connected to said last named part and extending into said fuselage, a rotatable member, a rack keyed to and shiftable on said rotatable member, a lever journaled on said rotatable member and connected to said linkage, a gear secured to said lever and journaled on said rotatable member, a gear unit carried by said rotatable member and including a gear meshing with said rack and a gear meshing with last named gear, means for rotating said rotatable member and means for shifting said rack.

3. In a helicopter having a fuselage and a rotor including a rotatable hub, a plurality of radial variable pitch vanes supported by and journaled on said hub, and mechanism for varying the pitch of said vanes including a part shiftable axially in said hub; mechanism for actuating said last named part comprising linkage connected to said last named part and extending into said fuselage, a rotatable member, a rack keyed to and shiftable on said rotatable member, a lever journaled on said rotatable member and connected to said linkage, a gear secured to said lever and journaled on said rotatable member, a gear unit carried by said rotatable member and including a gear meshing with said rack and a gear meshing with last named gear, means for rotating said rotatable member, and means for shifting said rack, said rotatable member constituting a tube on which said rack is shiftable longitudinally and said rack-shifting means including a cable connected at its ends to the ends of said rack, cable guide means positioning said cable in a loop, and a control lever connected to said cable to shift the said cable in said loop.

JOHN A. GREEN.

REFERENCES CITED

The following references are of record in the file of this patent:

UNITED STATES PATENTS

| Number | Name | Date |
|---|---|---|
| 1,722,708 | Robbins | July 30, 1929 |
| 1,797,669 | Oehmichen | Mar. 24, 1931 |
| 1,844,786 | Nelson | Feb. 9, 1932 |
| 2,273,303 | Waldron | Feb. 17, 1942 |
| 2,369,820 | Douglas | Feb. 20, 1945 |
| 2,374,834 | Rippingale | May 1, 1945 |
| 2,445,354 | Hoppes | July 20, 1948 |
| 2,471,904 | Seibel | May 31, 1949 |
| 2,474,362 | Keranen | June 28, 1949 |
| 2,476,516 | Thompson | July 19, 1949 |

FOREIGN PATENTS

| Number | Country | Date |
|---|---|---|
| 595,987 | Great Britain | Dec. 24, 1947 |
| 637,938 | France | Feb. 13, 1928 |